Alan J. Fisher,
*INVENTOR.*
BY S. J. Rotondi
A. T. Dupont
D. H. Ward

Oct. 13, 1964 A. J. FISHER 3,153,206

PHASE MODULATOR

Filed May 3, 1961 2 Sheets-Sheet 2

Alan J. Fisher,
*INVENTOR.*

BY S. J. Rotondi
A. P. Dupont
D. H. Ward 3,153,206
Patented Oct. 13, 1964

3,153,206

PHASE MODULATOR

Alan J. Fisher, 2004 Colice Road, Huntsville, Ala.

Filed May 3, 1961, Ser. No. 107,596
6 Claims. (Cl. 332—29)
(Granted under Title 35, U.S. Code (1952), sec. 266)

This invention may be manufactured and used by or for the Government for governmental purposes without the payment of royalty thereon.

This invention relates generally to modulation circuits and more particularly to such circuits which modulate the phase of an applied carrier signal by means of a bridged T network having reactances therein variable with respect to an applied modulating signal.

Phase modulators are used widely in missile telemetry systems employing high frequency transmitters. Telemetering of data from a missile requires the use of low power transmitters which have large modulation capabilities. Heretofore, phase modulators could not provide large angular modulation without sacrificing a great amount of power. In addition, phase modulators which are used for telemetering should not have an output with a large amount of amplitude modulation since they are not suitable for missile telemetering. In addition, since telemetering transmitters require a low power consumption, crystal oscillators having a low impedance characteristic of the output circuit have been employed for supplying a carrier signal to a modulator.

It is therefore a primary object of this invention to provide a simple and reliable phase modulator circuit having in combination a small power loss, a large modulating capability with a minimum audio signal in the very low frequency range, more favorable operating parameters, and greater stability to low impedance characteristics of a crystal oscillator output circuit.

This invention is a modified bridged T network evolved from a lattice network. The bridged T network has been limited to one embodiment; however, other modifications can be derived therefrom.

This invention will be more fully understood through the following specification taken in conjunction with the accompanying drawings in which.

In the following description identical numbers in the various figures designate identical items.

Figure 1:
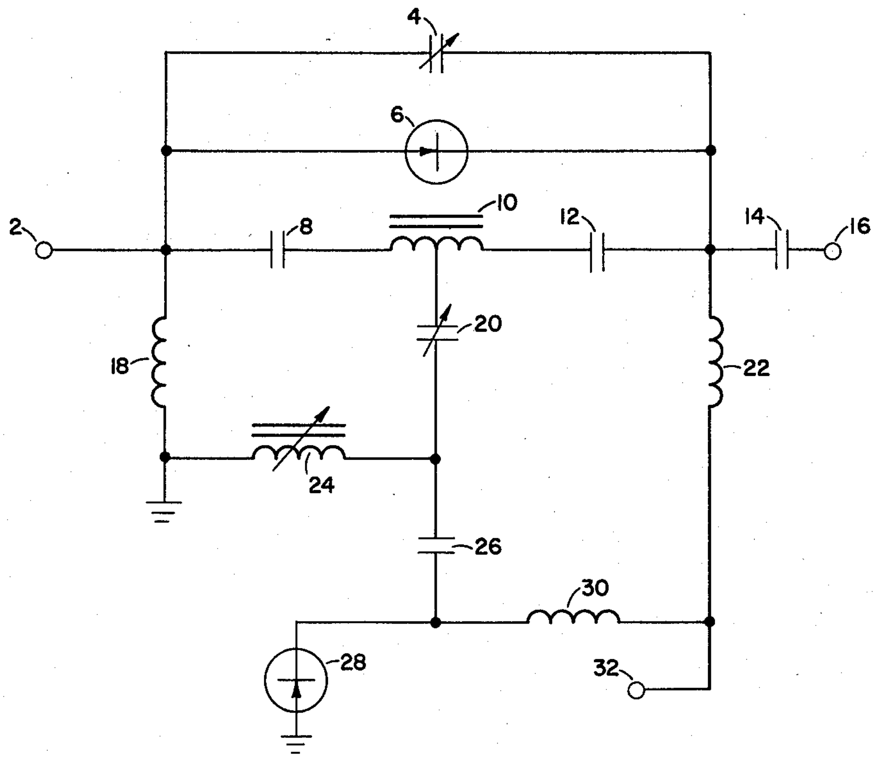
FIGURE 1 is one embodiment of the invention as employed in a telemetering transmitter.

Referring to FIGURE 1, one side of input terminal 2 is disposed for connection with a carrier signal source while the other side of terminal 2 is connected to trimmer capacitor 4, capacitance diode 6, capacitor 8, and inductor 18. Output terminal 16 is disposed for connection with a load on one side and on the other side is connected through capacitor 14 to inductor 22, capacitor 12, capacitance diode 6 and trimmer capacitor 4. Capacitance diode 6 and capacitor 4 and leakage inductance of coil 10 comprise the bridge of the bridged T network. Variable capacitor 20, capacitor 26 and inductor 24 comprise the quarter-wave network. Capacitor 8 and the adjacent one half of coil 10 comprise one leg, capacitor 12 and the other half of coil 10 comprise another leg, and the quarter-wave network and capacitance diode 28 comprise the last leg of the bridged T network. Inductors 18, 22 and 30 are for application of bias and modulating signal to the diodes and isolation of the carrier signal from the modulation signal. In addition inductor 22 in combination with capacitor 14 form a network to transform the charcteristic impedance to that of the output terminal.

Capacitors 8 and 12 serve as blocking capacitors so that bias may be applied to capacitance diode 6 without upsetting the symmetry of coil 10. The operation of the circuit will be more fully understood from the description of FIGURE 2.

Figure 2:
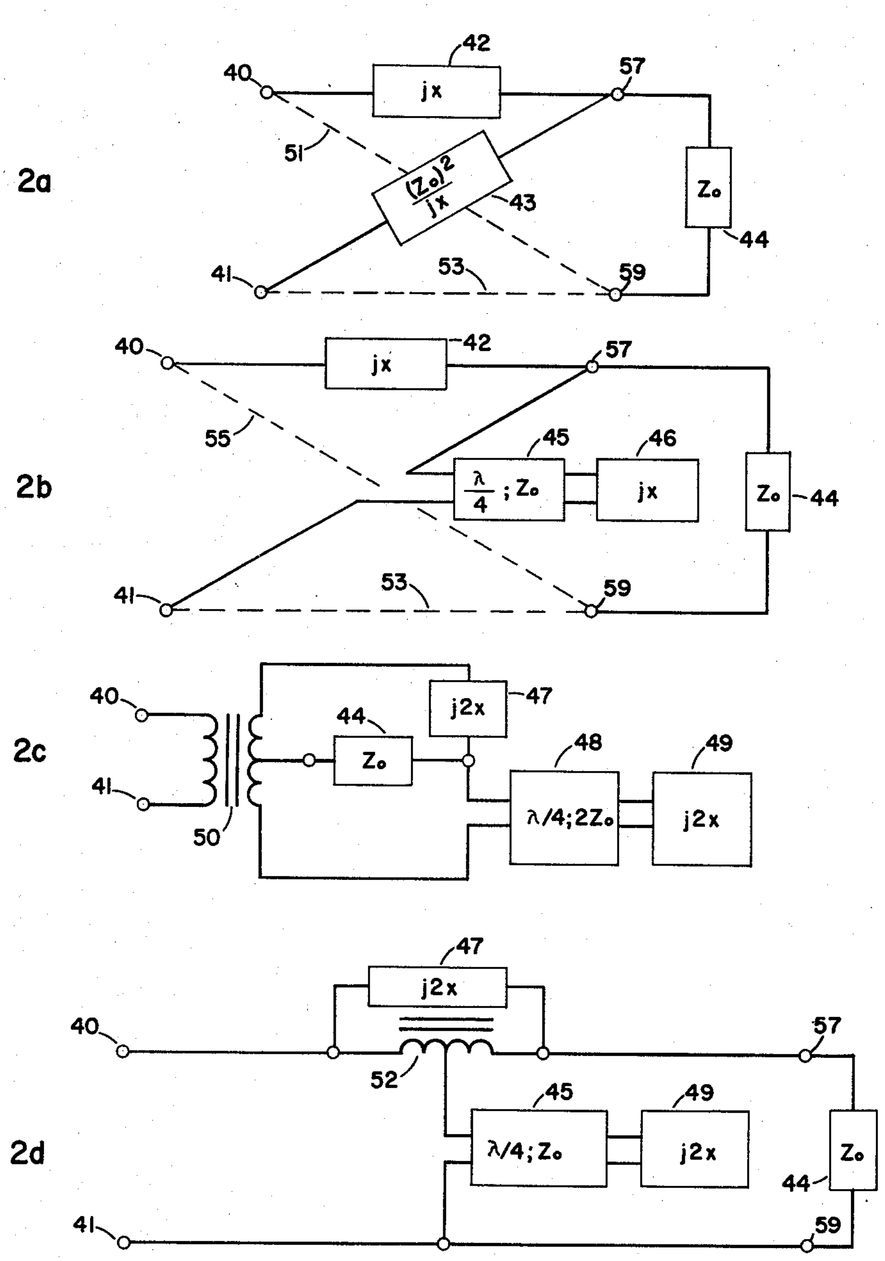
FIGURE 2 shows diagrammatically the steps in the evolution to a hybrid network and a bridge T network.

FIGURE 2 represents in four different circuits the evolution of the bridged T network.

FIGURE 2*a* illustrates the basic lattic network that can be evolved into a bridged T. FIGURE 2*b* illustrates a lattice network equivalent to that of FIGURE 2*a*. The circutis of FIGURES 2*a* and 2*b* are symmetrical and the legs are reactive and reciprocal. That is to say that dotted line 51 represents a line having an element equal to that of reactance 43, dotted line 53 represents a line having an element equal to that of reactance 42, and dotted line 55 represents a line having elements in the same cascade relationship as and equal to those of quarter-wave network 45 and reactance 46.

Referring to FIGURE 2*a*, it can be seen that reactance 43 represents the reciprocal of reactance 42. If the legs are reactive and reciprocal with respect to the characteristic impedance $Z_0$, then the network, when terminated in $Z_0$, has zero attenuation to all frequencies and a phase shift that changes with frequency. That can be seen if it is assumed that reactance 42 is a capacitance and to be reciprocal reactance 43 is an inductance. With this assumption in mind, a high frequency signal applied between terminals 40 and 41 will pass through reactance 42, load 44 and line 53; a low frequency signal will pass through line 51, load 44 and reactance 43. Load 44 is shown connected across output terminals 57 and 59. It can be seen, therefore, that as the frequency of an applied signal is increased from a direct current limit to an infinite frequency limit, the phase will change 180° through load 44. For a phase modulator, however, it is desired that the phase shift be variable at a constant input frequency rather than at a variable input frequency. This can be done by varying the two reactive legs together so that the reciprocal relationship is maintained. If one pair of reactive legs are capacitance diodes, then to be reciprocal the other pair of legs must be unusual inductances which can be varied by the same means and in a reciprocal relationship as to the capacitance diodes. This problem is solved by the insertion of a quarter-wave network which has the same charcteristic impedance as the lattice, because when a quarter-wave network is terminated with a reactance, the reciprocal to this reactance is always seen at the other end of the quarter-wave network. Therefore, the evolution to FIGURE 2*b*, which includes a quarter-wave network, allows the exclusive use of identical capacitance diodes as the variable reactances of the circuit.

Referring now to FIGURE 2*b*, terminals 40 and 41 are disposed for connection with a carrier signal, and reactances 42 and 46 and lines 53 and 55 are disposed for connection with a modulating signal for variation of the reactances therein. Reactance 46 is seen in the circuit at one end of the quarter-wave network 45 as the reciprocal of that at the other end. By varying reactance 46, the effect on the network would be the same as varying a reciprocal reactance in that line of the network. If reactances 42 and 46 are varied simultaneously by a common applied modulating signal, the phase through load 44 will change. This action produces a phase shift in the load 44 with a constant input frequency. This circuit, however, requires four variable reactances and therefore the evolution to the network of FIGURE 2*c*.

FIGURE 2*c* includes terminals 40 and 41 disposed for connection with a carrier signal, an ideal transformer 50, reactances 47 and 49, quarter-wave network 48, and load 44. A carrier signal at terminals 40 and 41 will induce a voltage in transformer 50 so that as the reactances are varied by an applied modulating signal from one limit to another, the phase in load 44 will change correspondingly. This can be seen if it is considered that as reactance 47 is a low impedance to the signal, reactance 49 through quarter-wave network 48 is a high impedance and vice versa.

The evolution to FIGURE 2*d* produces a network which has a common input and output terminal with the simplest transformer. Again terminals 40 and 41 are disposed for connection with a carrier signal and reactances 47 and 49 are disposed for connection with an applied modulating signal for variation thereof. Coil 52 acts as an ideal transformer since there is no leakage flux and induces a voltage in one half if a voltage is impressed on the other half. It is from this transformer action and the variation of reactances 47 and 49 that a phase shift is effected in load 44. If reactance 47 is a low impedance and impedance 49 through quarter-wave network 45 is a high impedance to the signal, the signal will pass through reactance 47 and load 44. If the reverse condition exists for the reactances 47 and 49, a voltage will be transformed on that half of coil 52 which is in the load circuit and will cause a reversal of phase through load 44.

The variable reactance of FIGURE 2*d* may be a capacitance diode alone or it may be the diode combined with other reactances. The tangent function of the basic phase formula for the network of FIGURE 2*a* and the capacitance voltage characteristic of the capacitance diode are two nonlinearities to be considered when trying to obtain a linear relation between diode control voltage and phase shift in the modulator. By forming the basic reactance from a capacitance diode and a constant inductance in series or shunt it is possible to find combinations where the two nonlinearities compensate. The shunt combination results in less signal voltage on the diode. With diode and inductance in shunt it was determined that, by making the ratio of diode reactance to load impedance equal to a specific constant, a linear phase versus diode control voltage characteristics could be obtaineo over a large angular shift in phase.

The phase modulator circuit of FIGURE 1 may be seen to be similar to FIGURE 2*d*. The reactance 47 is composed of capacitance diode 6 and the leakage inductance of coil 10. The quarter-wave network 45 is composed of variable capacitor 20, inductance 24, and capacitor 26. Capacitance diode 28 has no inductance shunting because a series capacitance at the input of a quarter-wave network is equivalent to a shunt inductance at the output, and therefore capacitor 20 may be slightly reduced in capacitance to correspond to an equivalent inductance shunting the capacitance diode.

Referring again to FIGURE 1, if a modulating signal is applied at terminal 32, the capacitance of diodes 6 and 28 will vary alike in accordance to the magnitude of that signal. If the signal at one instant is such; that the capacities of diodes 6 and 28 are small, an applied carrier signal at terminal 2 may see a high impedance through diode 6 and a low impedance in the leg containing the quarter-wave network and diode 28 are in parallel relation with a load at terminal 16, the coil 10 will transform a voltage from that half which is adjacent capacitor 8 to the other half. This transformed voltage will be in opposition to the voltage at terminal 16. If, however, the modulating signal at another instant is such that the capaciies of diodes 6 and 28 are large, the applied carrier signal will see a low impedance through diode 6 and a high impedance in the leg containing diode 28. This condition will abet the voltage at terminal 16. Therefore, as the modulating signal varies in time from a maximum to a minimum causing a large variation in diodes 6 and 28 alke, the phase through a load will vary accordingly.

Figure 3:
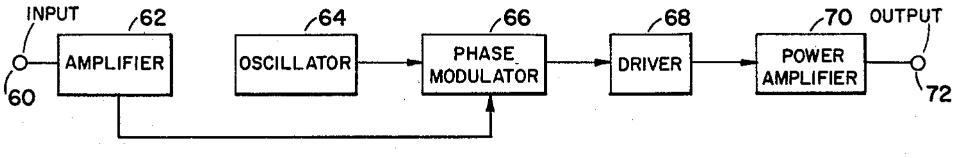
FIGURE 3 is a block diagram of a portion of a transmitter employing the invention.

FIGURE 3 is a block diagram of a portion of a transmitter employing the phase modulator of FIGURE 1. A signal applied to terminal 60 is amplified by amplifier 62 and applied to phase modulator 66 as the applied modulating signal to vary the capacitance diodes. Oscillator 64 supplies modulator 66 with a carrier signal which is modulated thereby and supplied through driver 68 and power amplifier 70 to an output 72.

It can be seen from the foregoing description that many embodiments and modifications can be derived from the basic embodiments shown. All the variations of circuit design of course are too many to describe within this specification. At best, innumeration of a few variations will suffice as suggestion of all other embodiments.

The quarter-wave network of the invention is only one form of a reflectance means. Transmission lines, wave guides and quarter-wave networks are a few examples of equivalents for a reflectance means and may be employed without changing the spirit or scope of the invention. A reflectance means may be employed with any reactance or combinations of reactances to evolve the same basic embodiment. For instance, a reactance element may have as an equivalent a cascaded network of a reflectance means in parallel with a reactance element of a reciprocal reactance thereto. Therefore, a capacitive network may be either a capacitance element or a cascaded reflectance means and inductance element. An inductive network may be either an inductance element or a cascaded reflectance means and capacitance element. Variation means for variation of the reactances of the circuit of course cover a wide field of choice; however, it can be seen that the choice of such means is irrelevant to the novelty of this invention. Variation by tuning capacitors or inductors, by electrical means, by mechanical movement, by pneumatic action, or by the electronic means of the preferred embodiment may be employed. It may be further noted that the placement of the capacitive and inductive reactances in the circuit is merely a matter of choice. It is accordingly desired therefore, that in construing the breadth of the appended claims they shall not be limited to the specific details shown and described in connection with the exemplifications thereof.

What is claimed is:

1. A modulation circuit of the character having a pair of input and a pair of output terminals disposed for respective connection to a carrier signal source and a load, said circuit comprising an inductive and a capacitive circuit means, respectively connected in series with the load for controlling the phase of an applied carrier signal in accordance to the magnitude of the respective inductive and capacitive reactances thereof, said capacitive circuit means including a reflectance means having a pair of input lines, and a pair of output lines for reflecting across said input lines an impedance reciprocal to that across said output lines, variation means connected to said circuit means for controlling the respective reactances thereof, coupling means connected in parallel with said series connected load and circuit means for applying a carrier signal thereto.

2. A circuit as in claim 1 wherein said inductive and said capacitive circuit means include resspectively a pair of inductive and a pair of capacitive networks, one of said inductive and one of said capacitive networks connected on one side to one of the input terminals and on the other side to one of said output and other of said output terminals respecitvely, other of said inductive and other of said capacitive networks connected on one side to other of the input terminals and on the other side to the other output and the one output terminal respectively.

3. A circuit as in claim 1 wherein said coupling means includes a coil having a center tap connected to one output terminal, said inductive and said capacitive circuit means connected on one side to the other output terminal and on the other side to opposite ends of said said coil, said coil disposed for connection across said carrier source.

4. A circuit as in claim 1 wherein said coupling means includes a coil having a center tap connected through said inductive circulit means to one input and one out put terminal, said coil connected between the other input and the other output terminal, said capacitive circuit means connected across said coil.

5. A circuit as in claim 1 wherein said reflectance means includes a quarter-wave network.

6. A phase modulation circuit comprising an input terminal having one side disposed for connection to a carrier signal source and the other side of said input terminal connected to one side of a trimmer capacitor, a capacitance diode, a first capacitor, and a first inductor; an output terminal having one side disposed for connection to a load and the other side of said output terminal connected through a second capacitor to one side of a second inductor, and one side of a third capacitor, and to the other sides of said trimmer capacitor and said capacitance diode; a coil connected between the other sides of said first and third capacitors, said coil having a center tap connected through a variable capacitor to one side of a variable inductor and a fourth capacitor; the other sides of said first inductor and said variable inductor connected to ground potential; a second input terminal having one side disposed for connection to a modulating signal source and the other side connected to one side of a third inductor and the other side of said second inductor; a second capacitance diode connected between ground potential and the other sides of said third inductor and said fourth capacitor.

References Cited in the file of this patent

UNITED STATES PATENTS

| | | |
|---|---|---|
| 2,140,769 | Schienemann | Dec. 20, 1938 |
| 2,191,315 | Guanella | Feb. 20, 1940 |
| 2,510,075 | Clavier et al. | June 6, 1950 |
| 2,964,637 | Keizer | Dec. 13, 1960 |

OTHER REFERENCES

| | | |
|---|---|---|
| 1,049,351 | France | Aug. 19, 1953 |